(12) United States Patent
Kim

(10) Patent No.: US 11,493,680 B1
(45) Date of Patent: Nov. 8, 2022

(54) SURFACE LIGHT EMITTING ILLUMINATION DEVICE USING CLOSED LED STRIP

(71) Applicant: FEELIS CO., LTD., Gwangju-si (KR)

(72) Inventor: Young-soo Kim, Gwangju-si (KR)

(73) Assignee: Feelis Co., Ltd., Gwangju-si (KR)

( * ) Notice: Subject to any disclaimer, the term of this patent is extended or adjusted under 35 U.S.C. 154(b) by 0 days.

(21) Appl. No.: 17/711,038

(22) Filed: Apr. 1, 2022

(30) Foreign Application Priority Data

Jul. 9, 2021 (KR) .......................... 10-2021-0090118

(51) Int. Cl.
| | | |
|---|---|---|
| *F21V 8/00* | (2006.01) | |
| *F21V 19/00* | (2006.01) | |
| *F21K 9/61* | (2016.01) | |
| *F21Y 115/10* | (2016.01) | |
| *F21K 9/237* | (2016.01) | |

(52) U.S. Cl.
CPC .............. *G02B 6/0023* (2013.01); *F21K 9/61* (2016.08); *F21V 19/002* (2013.01); *F21V 19/0035* (2013.01); *G02B 6/0021* (2013.01); *G02B 6/0068* (2013.01); *F21K 9/237* (2016.08); *F21Y 2115/10* (2016.08); *G02B 6/0073* (2013.01)

(58) Field of Classification Search
None
See application file for complete search history.

(56) References Cited

U.S. PATENT DOCUMENTS

| | | | | |
|---|---|---|---|---|
| 7,473,022 B2 * | 1/2009 | Yoo | ...................... | G02B 6/0021 |
| | | | | 362/621 |
| 2004/0004827 A1 * | 1/2004 | Guest | ................... | G02B 6/0091 |
| | | | | 362/249.06 |

FOREIGN PATENT DOCUMENTS

| | | | | | |
|---|---|---|---|---|---|
| GB | 2479590 A | * | 10/2011 | ........... | B21C 37/207 |
| KR | 20130056389 A | * | 5/2013 | ........... | G02B 6/0068 |
| KR | 20-0471587 Y1 | | 3/2014 | | |
| KR | 10-1491009 B1 | | 2/2015 | | |
| KR | 10-2018-0073896 A | | 7/2018 | | |
| KR | 10-2018-0095187 A | | 8/2018 | | |
| WO | WO-2010035230 A1 | * | 4/2010 | ........... | G02B 6/0021 |

\* cited by examiner

*Primary Examiner* — Alan B Cariaso
(74) *Attorney, Agent, or Firm* — Patent Office of Dr. Chung Park

(57) ABSTRACT

Provided is a surface light emitting illumination device including: a light guide panel on which a fine pattern is formed; a channel formed in a closed curve shape inside an edge of the light guide panel; an LED strip inserted in the channel, in which a plurality of LED chips are mounted on a flexible substrate at regular intervals; a fixing band inserted in the channel to fix the LED strip so that the LED strip is not separated from the channel; a channel communication part formed in the light guide panel to communicate with the channel.

3 Claims, 4 Drawing Sheets

[Fig. 1]
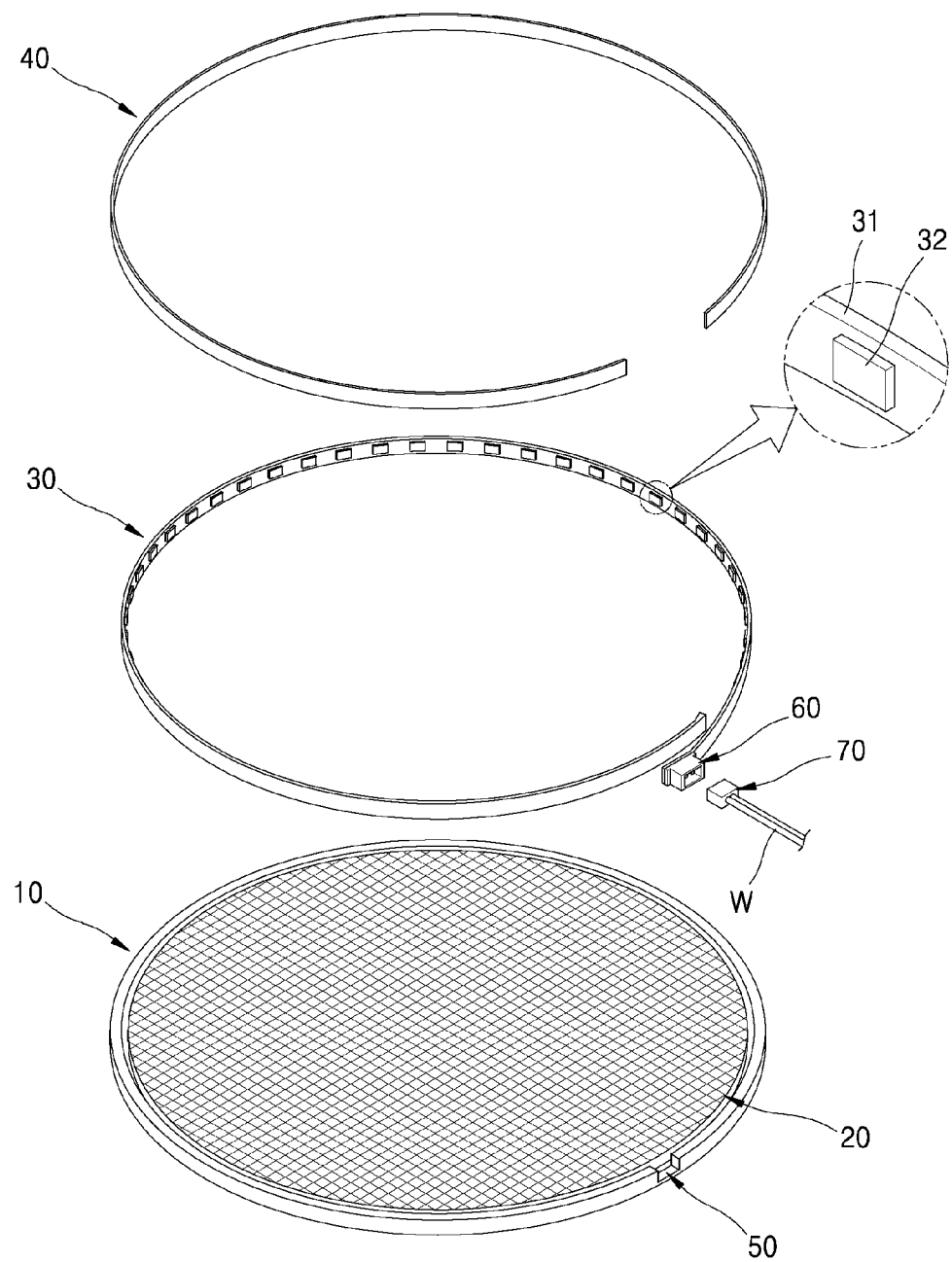

[Fig. 2]
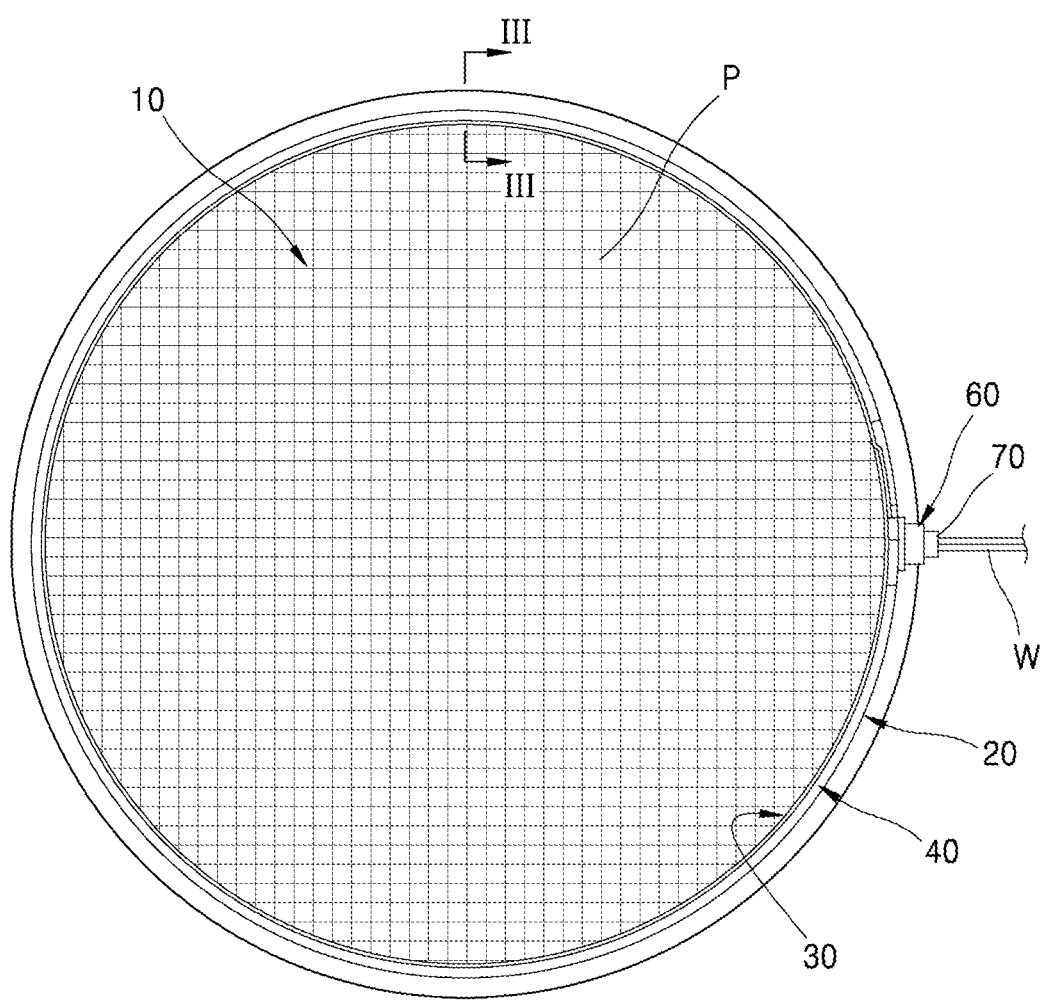

[Fig. 3]
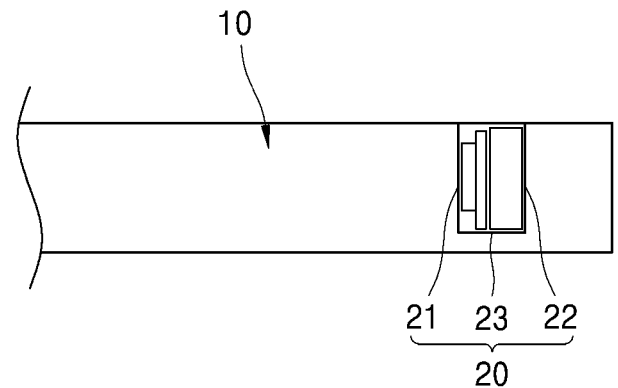
[Fig. 4]
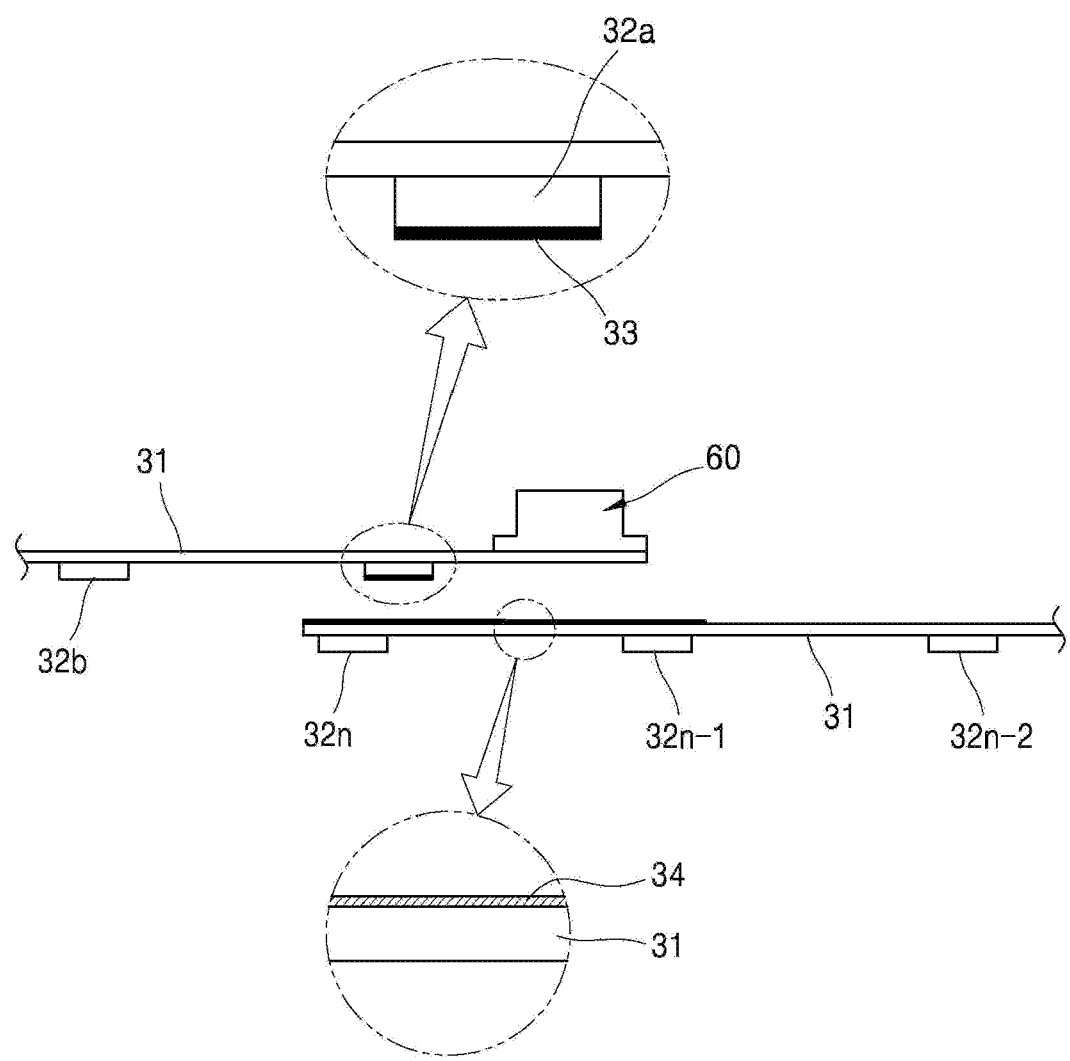

[Fig. 5]
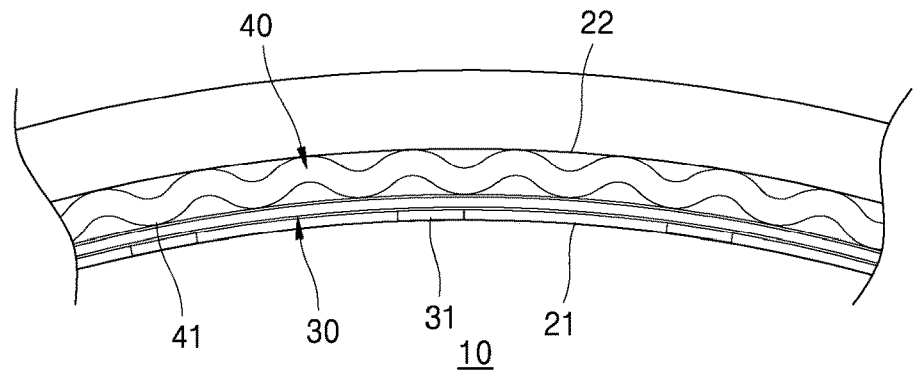
[Fig. 6]
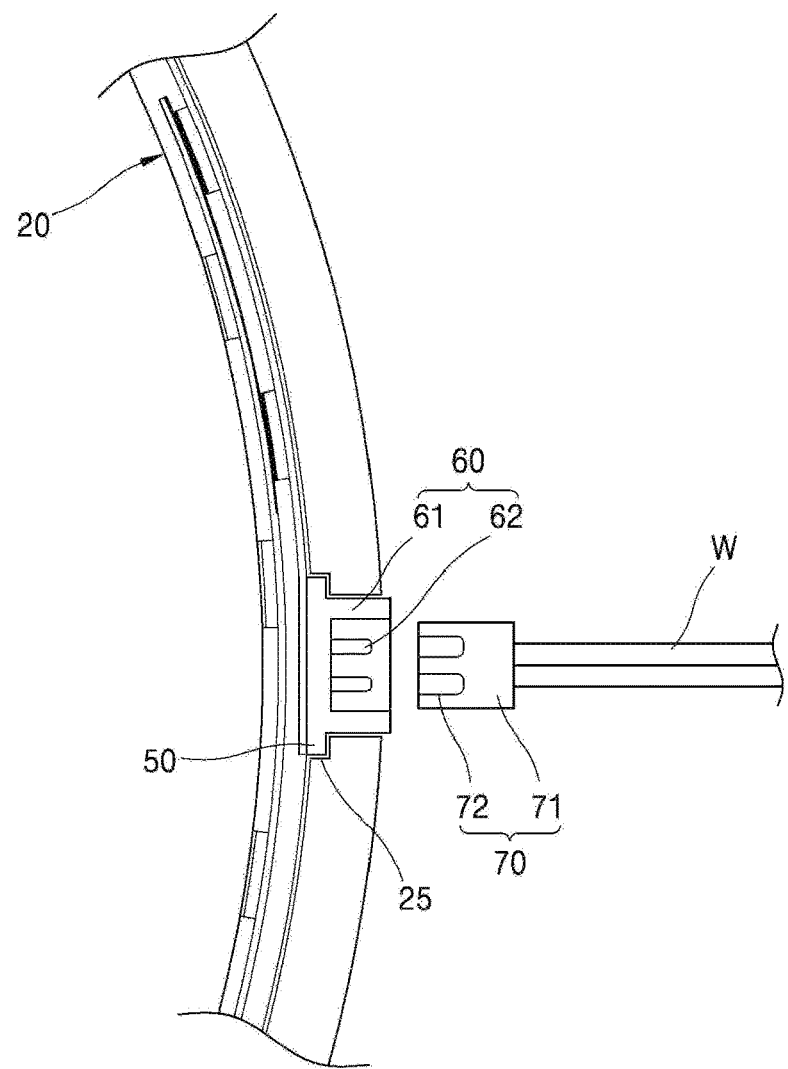

SURFACE LIGHT EMITTING ILLUMINATION DEVICE USING CLOSED LED STRIP

TECHNICAL FIELD

The present invention relates to a surface light emitting illumination device, and more particularly, to a surface light emitting illumination device using a closed LED strip capable of providing high-quality surface light emission using the closed LED strip.

BACKGROUND

The surface light emitting illumination device is a device for emitting light through a surface, which can be operated with low power and can be manufactured in various sizes, and has recently been used for information delivery such as promotion or product advertisement as well as illumination.

Such a surface light emitting illumination device includes a light guide panel having a fine pattern on its surface, an LED strip on which a plurality of LED chips are mounted around the side surface of the light guide panel, and an edge frame in a "U" cross-sectional shape for fixing the LED strip to the side surface of the light guide panel, and is made by attaching an information sheet with information content printed thereon to the light guide panel.

In such a surface light emitting illumination device, light emitted from the LED strip is introduced into the light guide panel, is reflected from the bottom, and is diffused through the pattern. As a result, the entire surface of the information sheet is irradiated with surface light to clearly display the printed information content.

However, in such a surface light emitting illumination device, since the LED strip is fixed to the light guide panel by the edge frame, processes such as manufacturing an edge frame material and cutting it to a necessary length, and fixing the LED strip with the edge frame are complicated.

In addition, while the light guide panel has various sizes depending on illumination devices made in various sizes to order, the size of the LED strip is standardized, and the interval between LED chips is constant. Accordingly, in a case where the LED strip is mounted around the side surface of the light guide panel having a specific size, a difference may occur between a first interval between the first LED chip and the last LED and a second interval between other LED chips.

Here, in a case where the first interval is larger than the second interval, that is, in a case where the interval between the first LED chip and the last LED chip of the LED strip is larger than the interval between other adjacent LED chips, the intensity of light generated in the first and last LED chips forming the first interval may be smaller than the intensity of light generated by another adjacent pair of LED chips. In this case, a shade may occur in the light guide panel, and the shade appears more conspicuous in a case where a white area exists in the information sheet, which results in deterioration of the surface light emission quality.

SUMMARY OF THE INVENTION

In order to solve the above mentioned problems, an object of the present invention is to provide a surface light emitting illumination device using a closed LED strip capable of simplifying a manufacturing process without using an edge frame.

Another object of the present invention is to provide a surface light emitting illumination device using a closed LED strip capable of performing high-quality surface light emission by removing a shaded area from a light guide panel.

According to an aspect of the present invention, there is provided a surface light emitting illumination device using a closed LED strip, including: a light guide panel 10 on which a fine pattern P is formed; a channel 20 formed in a closed curve shape inside an edge of the light guide panel 10; an LED strip 30 that is inserted in the channel 20 in a circular form, in which a plurality of LED chips 32 are mounted on a flexible substrate 31 at regular intervals; a fixing band 40 inserted in the channel 20 to fix the LED strip so that the LED strip 30 is not separated from the channel 20; and a channel communication part 50 formed in the light guide panel 10 to communicate with the channel 20.

In the surface light emitting illumination device, in a case where the plurality of LED chips are defined as a first chip 32a, a second chip 32b, a third chip 32c, . . . , an (n−2)-th chip 32n−2, an (n−1)-th chip 32n−1, and an n-th chip 32n, the LED strip 30 is provided so that a rear surface of the flexible substrate 31 corresponding to the n-th chip 32n is located above the first chip 32a.

In the surface light emitting illumination device, a first light shielding layer 33 for preventing light from being emitted toward the flexible substrate 31 is formed on a surface of the first chip 32a, and a second light shielding layer 34 is formed on the rear surface of the flexible substrate 31 under the first chip 32a to shield transmission of light partially passed through the first light shielding layer 33.

In the surface light emitting illumination device, the fixing band 40 is formed of a multiplicity of elastic curved parts 41.

In the surface light emitting illumination device, the surface light emitting illumination device using the closed LED strip may further include a female connector 60 that is inserted into the channel communication part and supplies electric power to the LED strip 30; and a male connector 70 that is detachably connected from the female connector 60.

According to the present invention, since the LED strip 30 is fixed in the channel 20 using the fixing band 40, it is possible to simplify the manufacturing process compared with a conventional edge frame.

Further, in a case where the LED strip 30 is disposed in the channel 20 in a circular form, since the rear surface of the flexible substrate 31 corresponding to the n-th chip 32n is located above the first chip 32a, it is possible to realize high-quality surface light emission with a shaded area in the light guide panel 10 being removed.

BRIEF DESCRIPTION OF THE DRAWINGS

FIG. 1 is an exploded perspective view of a surface light emitting illumination device using a closed LED strip according to an embodiment of the present invention.

FIG. 2 is a plan view of the surface light emitting illumination device in FIG. 1.

FIG. 3 is a schematic cross-sectional view taken along line of FIG. 2.

FIG. 4 is a view for schematically illustrating a state where both ends of the LED strip in FIG. 1 are overlapped.

FIG. 5 is a view for schematically illustrating elastic curved parts formed on a fixing band in FIG. 2.

FIG. 6 is a view for schematically illustrating a female connector and a male connector in FIG. 2.

DETAILED DESCRIPTION OF THE EMBODIMENTS

Hereinafter, a surface light emitting illumination device using a closed LED strip according to an embodiment of the present invention will be described in detail with reference to the accompanying drawings.

Hereinafter, a term "on" or "above" may include not only a direct contact state but also a non-contact state between adjacent objects. Terms such as a first, a second, and the like are used to represent various components, but the components should not be limited by the terms. These terms are used only for the purpose of distinguishing one component from another. A singular expression of a component includes a plurality of components unless the expression clearly represents a single component on its context. Further, in a case where a part "comprises", "includes", "has" or "is provided with" a certain component, it means that the part may further include other components, unless otherwise stated. Furthermore, terms such as "unit" and "module" mean a unit that performs at least one function or operation. In the drawings, the size of components may be exaggerated or reduced for convenience of description. For example, since the size and thickness of each component in the drawings are arbitrarily shown for convenience of description.

FIG. 1 is an exploded perspective view of a surface light emitting illumination device using a closed LED strip according to an embodiment of the present invention, FIG. 2 is a plan view of the surface light emitting illumination device in FIG. 1, and FIG. 3 is a schematic cross-sectional view taken along line in FIG. 2. Further, FIG. 4 is a view for illustrating a state where both ends of the LED strip in FIG. 1 are overlapped, and FIG. 5 is a view for illustrating elastic curved parts formed on a fixing band in FIG. 2. In addition, FIG. 6 is a diagram for illustrating a female connector and a male connector in FIG. 2.

As shown in the figures, a surface light emitting illumination device using a closed LED strip according to an embodiment of the present invention includes: a light guide panel 10 on which a fine pattern P is formed; a channel 20 formed in a closed curve shape inside an edge of the light guide panel 10; an LED strip 30 inserted in the channel 20, in which a plurality of LED chips 32 are mounted on a flexible substrate 31 at regular intervals; a fixing band 40 inserted in the channel 20 to fix the LED strip 30 so that the LED strip 30 is not separated from the channel 20; a channel communication part 50 formed in the light guide panel 10 to communicate with the channel 20; a female connector 60 provided in the channel communication part 50 to supply electric power to the LED strip 30; and a male connector 70 detachably coupled to the female connector 60.

The light guide panel 10 is made of a resin material such as an acrylic resin having a high transmitting property, on the surface of which the fine pattern P is formed to disperse light in horizontal and vertical directions. The light guide panel 10 may have various shapes, and in this embodiment, a circular shape is shown as an example.

The channel 20 is formed to form a closed curve on the surface of the light guide panel 10, and forms a space in which the LED strip 30 and the fixing strip 40 are accommodated. The channel 20 has a channel inner surface 21 and a channel outer surface 22 that are spaced apart from each other, and a channel bottom surface 23 that connects the lower ends of the channel inner surface 21 and the channel outer surface 22. The outer side of this channel 20 forms an edge.

The LED strip 30 has a configuration in which the plurality of LED chips 32 that emits light are mounted at regular intervals on the thin and flexible substrate 31, as shown in FIG. 1. The LED strip 30 is accommodated in the channel 20 so that the plurality of LED chips 32 face the channel inner surface 21.

The length of the channel 20 varies according to the size or shape of the light guide panel 10 and its position inside the edge of the light guide panel 10.

Further, the distance between the LED chips on the LED strip 30 varies depending on their output. The price of an LED strip decreases as the distance between LED chips increases, and therefore, an LED strip in which the LED chips are arranged at an interval as large as possible is preferred for cost reduction.

Accordingly, in a case where the LED strip 30 having a wide interval between the LED chips is inserted into the channel 20 having various lengths, a gap between the first and last LED chips may be larger than a gap between other LED chips. In this case, there is a difference between the intensity of light from the first and last LED chips and the intensity of light between other adjacent LED chips, which results in partial non-uniformity in the intensity of light introduced into the light guide panel 10 through the channel inner surface 21. This causes a partial shaded area in the light guide panel 10, which degrades the surface light emission quality.

In order to prevent such a problem, in a case where the LED strip 30 is mounted along the closed channel 20, a front end and a rear end of the LED strip are arranged to overlap each other.

More specifically, as shown in FIG. 4, in a case where a plurality of LED chips mounted on the flexible substrate 31 are defined as a first chip 32a, a second chip 32b, a third chip 32c, . . . , an (n−2)-th chip 32n−2, an (n−1)-th chip 32n−1, and an n-th chip 32n, when the LED strip 30 is mounted in channel 20, the rear surface of the flexible substrate 31 corresponding to the n-th chip 32n should be positioned above the first chip 32a. It is preferable that the rear surface of the flexible substrate 31 corresponding to the n-th chip 32n is positioned between the first chip 32a and the fifth chip 32f, and in this embodiment, an example that the rear surface of the flexible substrate 31 corresponding to the n-th chip 32n is positioned between the first chip 32a and the second chip 32b is shown.

Here, a first light shielding layer 33 is formed on the surface of the first chip 32a to prevent light from being emitted toward the flexible substrate 31. The first light shielding layer 33 may be implemented in various ways, and in this embodiment, it is made of a black paint.

In addition, a second light shielding layer 34 is formed on the rear surface of the flexible substrate 31 under the first chip 32a to shield transmission of light partially passed through the first light shielding layer 33. The second light shielding layer 34 may be implemented in various ways, and in this embodiment, it is made of a black paint.

With this structure, it is possible to prevent decrease in the intensity of light between the first chip 32a and the n-th chip 32n in a case where the gap between the first chip 32a which is the first LED chip and the n-th chip 32n which is the last LED chip is larger than the gap between other adjacent LED chips. Accordingly, it is possible to prevent generation of a shaded area, and thus, it is possible to improve the surface light emission quality of the light guide panel 10.

The fixing band 40 is provided to fix the position of the LED strip 30 in the channel 20 and to push the plurality of LED chips 32 toward the inner side surface 21 of the channel. The fixing band 40 is made of a resin material that is cut from a long base material at an appropriate length, and has a length shorter than the entire length of the channel 20 and a width slightly smaller than the depth of the channel 20 in order to be inserted in the channel 20. Accordingly, in a state where the fixing band 40 is accommodated in the channel 20, as shown in FIG. 3, the fixing band 40 is not exposed from the surface of the light guide panel 10.

On the other hand, the fixing band 40 is inserted into the empty space between the rear surface of the LED strip 30 and the channel outer surface 22 to push the plurality of LEDs 32 forming the LED strip 30 toward the channel inner surface 21.

However, in a case where the LED strip 30 is operated for a long period of time, the gap between the channel outer surface 22 and the channel inner surface 21 or the thickness of the fixing band 40 may be slightly changed due to heat generated from the LED chips 32. In this case, a specific LED chip among the plurality of LED chips 32 may be partially spaced apart from the channel inner surface 21, and in this case, the intensity of light introduced into the light guide panel 10 through the inner channel surface 21 after being emitted from the plurality of LED chips 32 partially becomes non-uniform. In this case, the brightness of the light emitted from the surface of the light guide panel 10 does not become uniform, and thus, the surface emission quality is lowered.

In order to prevent such a problem, in the present embodiment, the fixing band 40 is provided to include a multiplicity of elastic curved parts 41, as shown in FIG. 5. With this configuration, in a case where the fixing band 40 is inserted between the LED strip 30 and the channel outer surface 22, the elastic curved parts 41 press the LED strip 30 toward the channel inner surface 21 side, and accordingly, even in the case of a long-time use, it is possible to prevent the LED chip 32 from being partially spaced apart from the channel inner surface 21, and thus, it is possible to maintain a uniform brightness at all times, thereby realizing high-quality surface light emission.

The channel communication part 50 provides a space in which the female connector 60 for supplying electric power to the LED strip 30 is mounted.

The female connector 60 includes a female connector body 61 that is directly connected to the flexible substrate 31 at one end of the LED strip 30, and a first terminal 62 that is installed inside the female connector body 61 and is electrically connected to the LED strip 30.

Since the female connector 60 is connected to the LED strip 30 to form a single body, it is possible to perform assembly with the light guide panel 10 by a simple operation of inserting the female connector 60 into the channel communication part 50 in a state where the LED strip 30 is inserted in the channel 20.

The male connector 70 is connected to a power supply line W, and includes a male connector body 71 that is inserted into the female connector body 61, and a second terminal 72 that is mounted on the male connector body 71 and is detachably connected to the first terminal 62.

In the surface light emitting illumination device of the present invention, since the male connector 70 can be separated from the female connector 60, it is possible to enable mass production of the light guide panels 10, in which the female connector 60 is combined in a single body, for stack-storage.

On the other hand, the female connector 60 should not be separated to the outside of the light guide panel 10 while being inserted into the channel communication part 50. To this end, as shown in FIG. 6, a pair of channel steps 25 are formed in a region of the channel outer surface 22 connected to the channel communication part 50, and stepped protrusions 65 to be supported on the pair of channel steps 25 are formed on both sides of the female connector 60. With this configuration, in a case where the female connector 60 is inserted into the channel communication part 50, since the stepped protrusions 65 are locked on the channel steps 25, it is possible to fix the position of the female connector 60 without use of an adhesive or the like.

As described above, according to the present invention, since the LED strip 30 is fixed in the channel 20 using the fixing band 40, it is possible to simplify the manufacturing process compared with a conventional edge frame.

In addition, in a case where the LED strip 30 is disposed in the channel 20 in a circular form, since the rear surface of the flexible substrate 31 corresponding to the n-th chip 32$n$ is located above the first chip 32$a$, it is possible to realize high-quality surface light emission with a shaded area in the light guide panel 10 being removed.

Although the present invention has been described above with reference to the embodiment shown in the drawings, it will be understood by those skilled in the art that various modifications and equivalents may be made in a range without departing from the concept of the invention.

What is claimed is:

1. A surface light emitting illumination device using a closed LED strip comprising:
    a light guide panel on which a fine pattern P is formed;
    a channel formed in a closed curve shape inside an edge of the light guide panel;
    an LED strip that is inserted in the channel in a circular form, in which a plurality of LED chips are mounted on a flexible substrate at regular intervals;
    a fixing band inserted in the channel to fix the LED strip so that the LED strip is not separated from the channel; and
    a channel communication part formed in the light guide panel to communicate with the channel,
    wherein in a case where the plurality of LED chips are defined as a first chip, a second chip, a third chip, . . . , an (n−2)-th chip, an (n−1)-th chip, and an n-th chip, the LED strip is provided so that a rear surface of the flexible substrate corresponding to the n-th chip is located above the first chip,
    a first light shielding layer for preventing light from being emitted toward the flexible substrate is formed on a surface of the first chip, and
    a second light shielding layer is formed on the rear surface of the flexible substrate under the first chip to shield transmission of light partially passed through the first light shielding layer.

2. The surface light emitting illumination device according to claim 1,
    wherein the fixing band is formed of a multiplicity of elastic curved parts.

3. The surface light emitting illumination device according to claim 1, further comprising:
    a female connector that is inserted into the channel communication part and supplies electric power to the LED strip; and a male connector that is detachably connected from the female connector.

\* \* \* \* \*